(12) United States Patent
Nunn (10) Patent No.: US 7,503,723 B2
(45) Date of Patent: Mar. 17, 2009

(54) RESILIENT SURROUND TILES

(76) Inventor: Sacha David Nunn, 114 Opanuku Road, Auckland, Henderson Valley (NZ) 0612

( * ) Notice: Subject to any disclaimer, the term of this patent is extended or adjusted under 35 U.S.C. 154(b) by 0 days.

(21) Appl. No.: 11/588,346

(22) Filed: Oct. 27, 2006

(65) Prior Publication Data
US 2007/0113502 A1 May 24, 2007

(30) Foreign Application Priority Data
Oct. 27, 2005 (NZ) .................................. 543265

(51) Int. Cl.
*E01C 5/18* (2006.01)
(52) U.S. Cl. .......................................... 404/32; 404/42
(58) Field of Classification Search .................. 404/32, 404/34, 35, 41, 42; D25/113; 52/396, 596
See application file for complete search history.

(56) References Cited

U.S. PATENT DOCUMENTS

| 552,445 | A | * | 12/1895 | Platt ............................. 404/41 |
| 888,530 | A | * | 5/1908 | Pugh .......................... 52/311.2 |
| D161,722 | S | * | 1/1951 | Waller ........................ D25/113 |
| 3,443,492 | A | * | 5/1969 | Pleass ........................... 472/90 |
| 6,443,667 | B2 | * | 9/2002 | Brown ...................... 405/302.6 |
| D464,741 | S | * | 10/2002 | Brady et al. ................ D25/113 |
| 6,709,192 | B2 | * | 3/2004 | Smith ........................... 404/47 |
| D494,686 | S | * | 8/2004 | Mignone ................... D25/113 |
| 6,945,732 | B2 | * | 9/2005 | Renick ......................... 404/35 |

* cited by examiner

*Primary Examiner*—Gary S Hartmann
(74) *Attorney, Agent, or Firm*—Young & Thompson (57) ABSTRACT

Tiles made of a resilient material bear an irregular rippled surface shaped so that the ripples pass from one tile to another without discontinuity. The rippled surface is taken from a natural surface such as beach or river sand which has had water flowing over it. Applications include covering the surrounds of swimming pools and areas where play or gymnastics occurs. The resilient material may be new or recycled rubber. The tiles may take the form of elongate strips, supplied in rolls.

5 Claims, 7 Drawing Sheets

RESILIENT SURROUND TILES

FIELD

This invention relates to a resilient paving surface, and method for producing paving comprised of resilient tiles.

BACKGROUND

The walking area surrounding a swimming pool, to consider one example application, has typically been constructed from poured or slab concrete, or from ceramic tiles, and is often finished to a smooth surface because in the past people have been more concerned to achieve an "easy-clean" result (or an appearance of one) than a safe surface. It is likely that people will fall on this surface which may not be clean, and can become very slippery such as by the accumulation of chemicals or algal growth. The risk of falling is raised when people are climbing out of the pool; perhaps readjusting to walking in air or after perhaps becoming quite exhausted in the water. Some people play with balls and the like as either organised or informal games, and may over-reach themselves when catching. Impact on a concrete or ceramic surface is inherently of high force and there is a risk of unconsciousness (next to a pool of water) or skull fractures.

Wet smooth tiles provide almost no grip at all to hard smooth soles on shoes or sandals, and a person beside a pool may be wearing unaccustomed footwear on loan or hire.

Some ceramic tiles are provided with ridges and grooves so that grip is enhanced, but that applies mainly to a foot bearing weight. It would be useful to encourage draining, perhaps back into the pool for filtering of dirt, or perhaps out into a drain.

Other example applications for the invention, which provides a replacement for ceramic tiles of the type described above, include areas where gymnastics is done, or industrial situations where the floor may become greasy, oily or slimy as a result of required activities.

OBJECT

It is an object of this invention to provide an improved kind of a surfacing material to cover surfaces at risk of causing personal injury or at least to provide the public with a useful choice.

STATEMENT OF INVENTION

In one aspect the invention provides a set of paving tiles, each having an upper surface patterned with irregular sinuous troughs extending to at least two edges of the upper surface, wherein the configuration of troughs at an edge of the upper surface of each tile is complementary to the configuration of troughs at an edge of the upper surface of at least one other tile in the set, whereby tiles can be abutted so that troughs are aligned and conjoined across a plurality of tiles.

Preferably the configuration of troughs at an edge of a tile is complementary to the troughs at a section of an edge formed across two abutted tiles, whereby a staggered arrangement of abutted tiles can create aligned and conjoined troughs across a plurality of tiles. The joins between tiles meet at "T" or three-way intersections rather than at "X" or four-way intersections, so that surface deterioration and/or attack at joints is minimised.

Preferably the set includes a plurality of tiles having one edge of the upper surface complementary to a second edge of the same surface, whereby substantially identical tiles can be arranged in a series with troughs aligned and conjoined.

Preferably the ridges form a pseudo-random arrangement of repeating ridges and depressions and are not geometric (i.e. they are not rectilinear). Optionally they are asymmetrical, with a steeper aspect on one side than the other, shared between nearby ridges, resembling a natural phenomenon.

Preferably the undulating upper surface of the tile exhibits pointed crests and rounded troughs (in section), and the lines of the crests may bifurcate or peter out along their lengths.

Preferably each tile has an upper surface formed at least in part from a cast of a bed of granular material rippled by fluid flow to form sinuous troughs and ridges.

Preferably the tiles are formed at least in part from a resilient material, whereby the tiles can provide a resilient paved surface.

Preferably the tiles are formed at least in part from an elastomer.

Preferably the tiles are also formed at least in part from rubber, such as recycled rubber chips.

In one instance the shaped upper surface of a tile is comprised of a mixture of EPDM (ethylene propylene diene monomer) rubber chip pre-mixed with liquid urethane. In the same instance the deeper lower portion of the tile is comprised of a mixture of recycled tyre rubber chip pre-mixed with liquid urethane; the relative proportions varying according to site requirements.

Preferably each tile comprises an elongate strip having two opposed long edges and two opposed short edges, and having the upper surface patterned with a repeating pattern of sinuous troughs extending from one short edge to the other.

Preferably the set further includes a resilient grouting material by which the tiles are joined together to form a unitary resilient paving surface.

Preferably the set further includes a settable surface-coating compound by which the upper surfaces of the tiles are coated to form a unitary paving surface.

Preferably the settable surface-coating compound is comprised of urethane, rubber and sand.

Preferably the pattern is obtained physically, such as by taking a cast of actual ripples over an area and replicating the cast surface by a moulding process.

Optionally the physical surface can be created with software and later applied to a working surface against which tiles are to be formed by shaping procedures such as numerically controlled or pantograph-controlled milling, spark erosion, slumping against a heat-resistant shape (for glass), or hand carving.

Alternatively the pattern of ridges and depressions is taken such as by photographic means from a natural site (such as from a beach) where water or air moving over sand has caused a repetitive ridging to develop; the optical elements allowing the ripples to be scaled to different dimensions.

Optionally a "simulated river delta" can be made in a tank inside premises, and used under much closer control than is possible outdoors in order to create ripple patterns of a desired appearance.

Optionally a natural pattern is further processed by method including (a) recording an image of the natural pattern, as by photography, (b) selecting a rectangular area from a representation of the image to be repeated in the surface of the tiles, (c) by means of an image editing procedure such as by use of graphics instruments, amending the ridges towards the edges of the minimum area so that one copy of the minimum area may be placed alongside another copy of the minimum area without discontinuity, and (d) making a plurality of copies of the edited image in a medium providing resilient tiles.

In one option, tiles made by casting singly, in flat moulds against an aluminium shaped surface.

In an alternative option the tiles are made by casting in long strips within a drum press.

PREFERRED EMBODIMENT

The description of the invention to be provided herein is given purely by way of example and is not to be taken in any way as limiting the scope or extent of the invention.

DETAILED DESCRIPTION OF THE PREFERRED EMBODIMENTS

Tiles made according to the invention usually exhibit the following characteristics.

1. Tiles have a body made of a resilient material (such as recycled rubber or an elastomer or an elastomer blend, for instance polybutadiene (BR), polychloroprene (CR), polyisoprene (PIP), nitrile rubber (NBR), styrene-butadiene rubber (SBR), butyl rubber (IIR), ethylene-propylene rubber (EPM), including terpolymers with dienes (EPDM), propylene oxide rubber (POR), chlorohydrin rubber (CHR) or fluorine rubber (FE)). Elastomers with good resistance to degradation under the expected environment (often a wet, impulse-receiving, high ultra-violet environment) are preferred.

Recycled rubber which generally has a black appearance may be used in a basal layer of the invention, or throughout. First-time use or virgin rubber has a buff or light brown appearance (if not coloured) that is similar to the appearance of shell or rock-based sand.

2. Tiles bear a rippled (or profiled) exposed surface having a pattern of ridges or bumps arranged to pass over joints between individual tiles without discontinuity. In one version, the rippled surface is taken from a natural surface such as beach or river sand which has had water flowing over it. Creation of the surface configuration may be taken as a cast using well-known materials such as plaster, latex rubber, wax, or the like, or by other methods as detailed later.

3. A ripple outline could be computed, taken from nature and then modified using a computer-based or other image modification technique so that the final rippled surface may represent or resemble a small part of a surface found in nature.

4. The outline in plan view of each tile is intended to be the same (as is usual for tiles) in order to minimise difficulty of laying.

5. The configuration of tile edges are made to be compatible with those of adjacent tiles, so that ridges can appear to sweep from tile to tile across joints without interruption;

6. A variation of this invention presents a rippled surface as a broad layable sheet material (see below) including a plurality of repeated sections of pattern.

Figure 1:
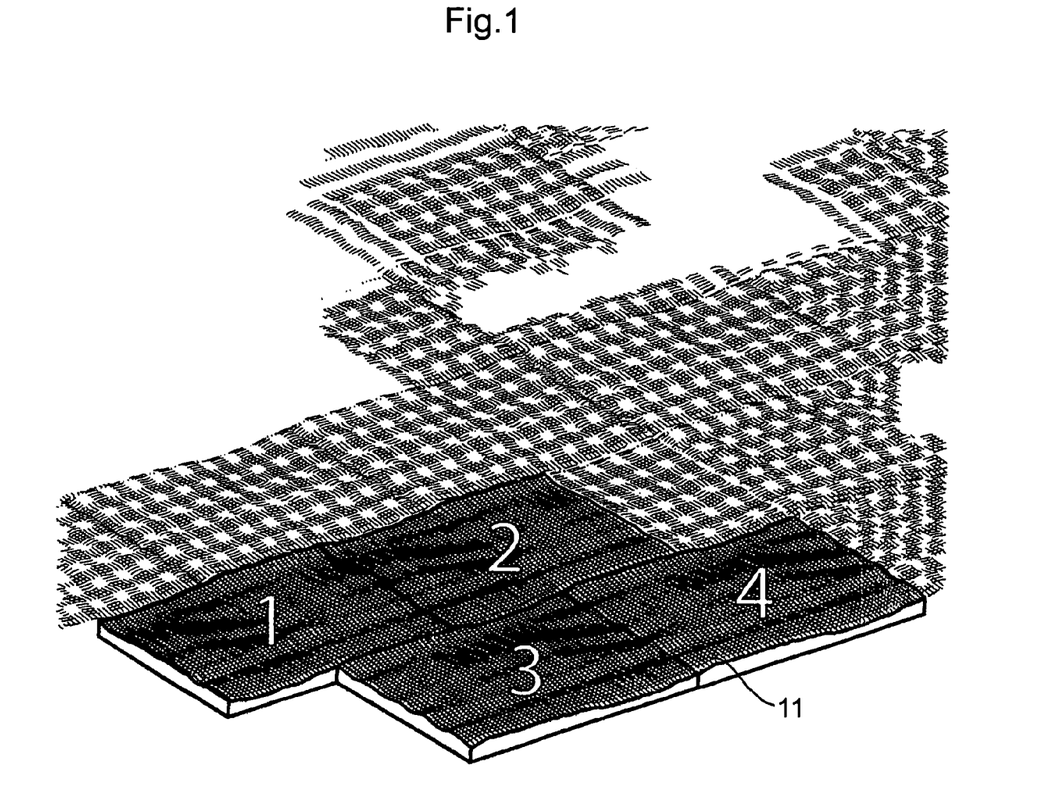
FIG. 1: is a perspective diagram showing four adjoining shaped tiles according to example 1.
Figure 2:
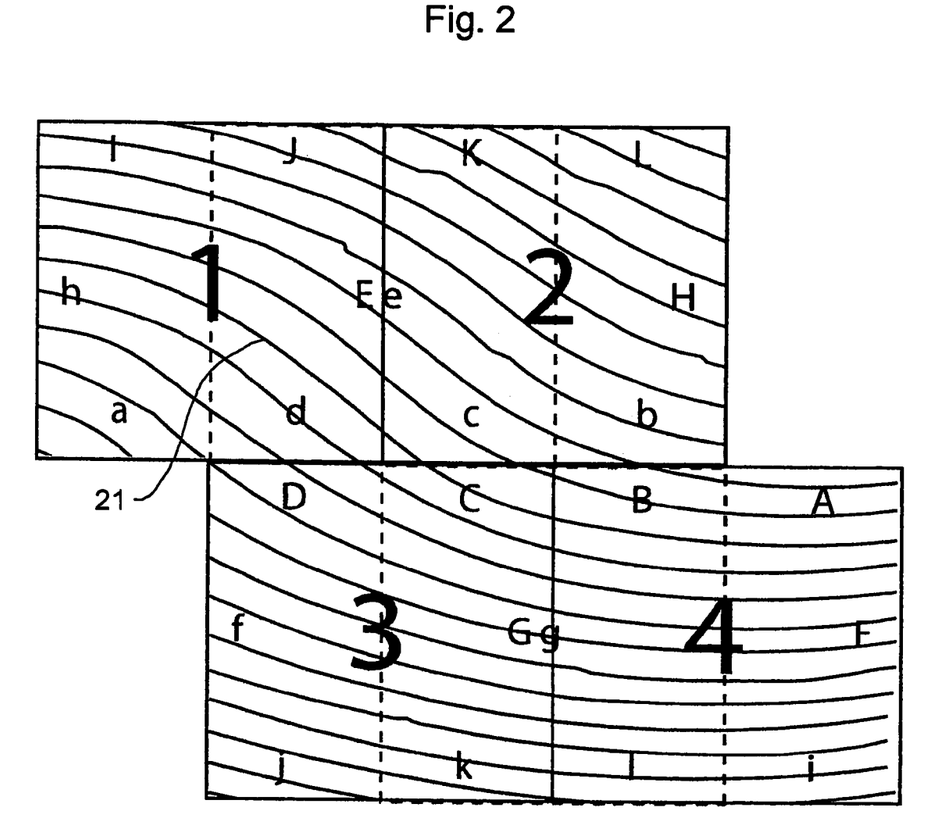
FIG. 2: is a line drawing in plan aspect showing the four tiles and ripple patterns passing over a surface across the tiles, in this instance without branching and halting of troughs or ridges.

PROCESSES: This example relates to an area cover of units or tiles, each made of a resilient material so that the tile when affixed to a rigid substrate exhibits resilience or "give" such that a person may fall onto the tile from a height of up to 1.5 metres with little risk of injury. FIG. 1 illustrates four tiles 1-2-3-4 according to the invention within a larger area covered with similar tiles, having an undulating upper surface (11). This set of four tiles comprises one unit of a repeating pattern, as shown more clearly in FIG. 2. FIG. 2 shows the same four tiles in the form of a line drawing, with adjacent surfaces marked for example d-D and g-G. All upper case/lower case pairs are intended to be mounted contiguously. Note how the lines of ripples (e.g. 21) appear to sweep uninterruptedly from tile to tile.

Figure 6:
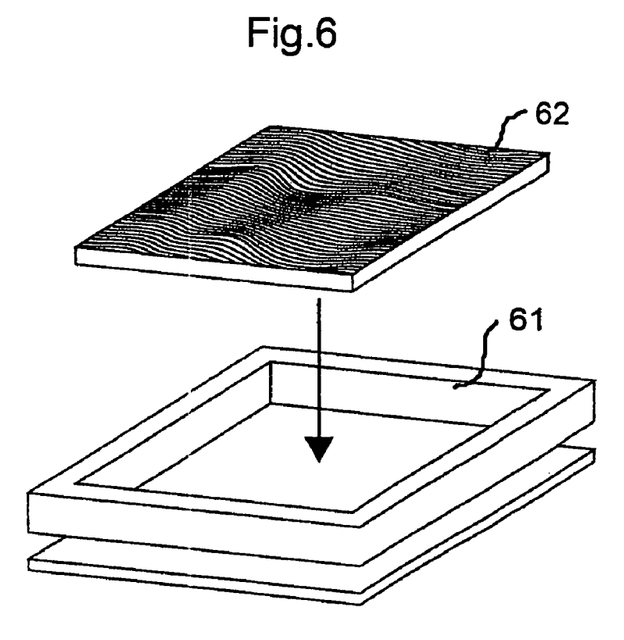
FIG. 6 and FIG. 7: illustrate a process for making a durable mould for tiles. The arrow signifies indicia.

Regardless of surface finish, tiles are usually made of resilient material according to a procedure typically as follows:

1. Tiles are cast in rectangular moulds (FIGS. 6 and 7) having a side wall 61 and a configured base plate 62, as shown particularly in FIG. 6. The moulded material may be dried or set using heat, ultraviolet light, or a chemical action (such as a two-pot mix or a setting process fostered by sulphur, or a volatilisation of solvent, as is appropriate for the particular resilient materials used. The side wall is carried as high (above the inside floor, after mounting) as the required thickness of the final product.

2. It may be helpful to work with arrays of moulds (e.g. 6×8) and provide tiles for sale with frangible links from one to a corresponding neighbour, for speed of casting and ease of installation.

Figure 3:
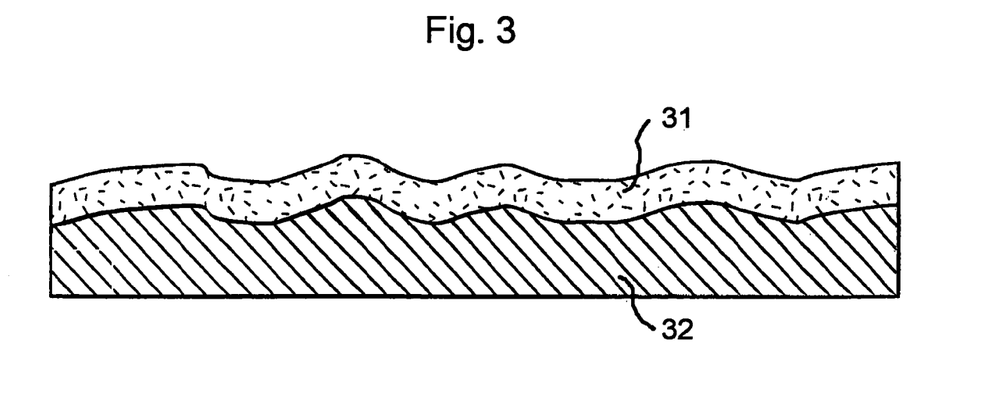
FIG. 3: shows an elevation section though a bilayered tile.
Figure 4A:
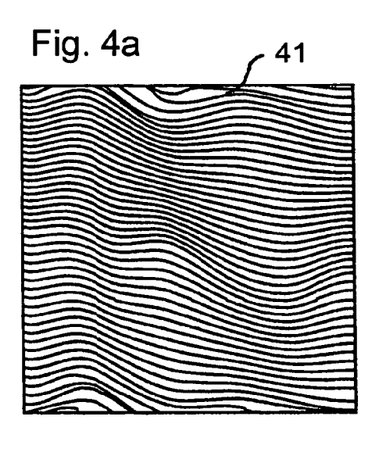
FIG. 4 and FIG. 5: illustrate a procedure for modifying tile edges so that ripples run across from one modified tile to another.
Figure 4B:
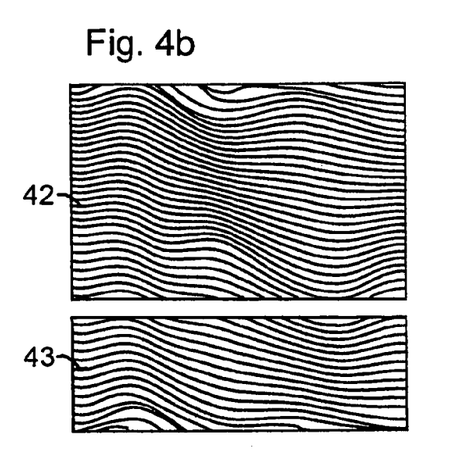
Figure 4C:
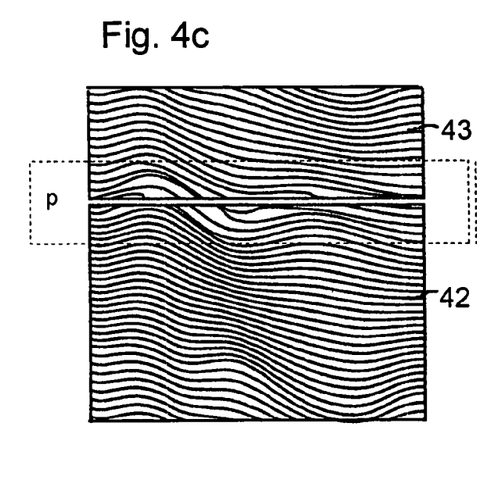
Figure 4D:
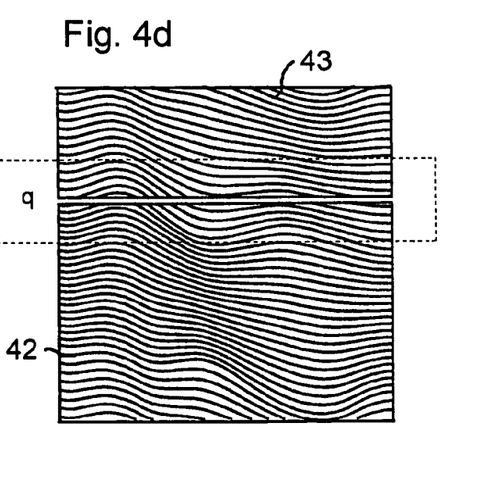

3. Tiles may be made in a two-layer poured process in which the under layer has a different degree of resilience, a different appearance, and possibly a different cost to that of the upper layer, so that the relative amounts in each layer can be optimised. Perhaps a three-layer tile may be made. FIG. 3 shows a vertical section through a tile according to the invention. The upper surface 31 is made of ethylene-propylene rubber including terpolymers with dienes (EPDM), which would have a texture and colour not unlike sand, while the lower layer 32 is a backing made of (also resilient) recycled rubber chip. The proportion of each would depend on the specific application and relative costs of the two components.

Origination of the Modulated Surface Pattern

Techniques for creating the modulated surfaces in the mould base plate (b) include:

1. Taking a cast at a beach or other site where water has flowed and created a pattern of ripples, using plaster, wax, latex, synthetic materials, or the like, and using that cast to mould a base plate, so as to create a form for tiles, or sheets of adjoining tiles, which carry the same surface texture as the original natural surface;

having an artist or craftsman modify a natural configuration, and in particular to modify the configuration to create a repeating pattern;

or using an artist or craftsman to create an analogous surface. Replication of selected portions of the surface by casting or analogous methods is also proposed.

2. Using photographic or other optical techniques to record the modulations in a natural surface. These would then be stored as computer files and then used as source material for re-creating the modulations as recorded or after modification; perhaps in size, in depth, or in shape. Recreation may involve a craftsman working to a printed image, or a numerically controlled shaping machine such as a mill or a melter or a spark erosion device.

3. Making a "delta flow" tank—a large tray with raised sides and a bed of selected sand, mounted at a slight angle so that pumped water will flow over the surface, carrying sand in suspension and redistributing the sand over the bottom of the tank; then the water is pumped back to the top. When a suitable pattern of ripples or ridges has developed, the flow is stopped, the tank is drained, and the ripples are recorded when the sand has dried (to the extent of losing free water) by techniques as previously described in this section. Many options to cause variations are available under such controlled conditions: for example sand type including density, particle size(s), of sand; water depth, water flow rate, turbulence initiation, cyclic changes in water flow, and time. Some results include parallel ripples, diamond patterns, and climbing faults are seen which cover a transition from one to the other. Being in control of the environment also allows control over lighting if optical recording is used.

As an option, a pattern maker may use a wind flow test area comprising a wide, flat, slow-speed wind tunnel. This option is more suited to optical recording, or use of a casting method that first "hardens" the dry sand somewhat. An artist or craftsman may simply copy the created pattern. The moisture content of the moving air and hence the sand can be controlled.

The tiles preferably provide a non-obviously replicated pattern of modulated surface, so that identical set of tiles can be repeated ad infinitum, for lowering of costs. The pattern of ridges and troughs is preferably irregular, but flows from one tile to the next, to provide continuous troughs which facilitate drainage of water off the paved surface and provide a natural appearance. Naturally derived patterns that were formed as a result of water flow will tend to reflect an efficient pattern of drainage, as long as the laid-down tiles have the same direction of slope as was present when the ripples were formed. The inventor believes that the ripple patterns formed by the interaction of sand and flowing water on a sloping surface are an optimal flow pattern from the point of view of the water. Therefore tiles according to the invention should drain relatively efficiently, if laid down in an appropriate orientation. Even if the drainage is not optimal, some flow should occur and being natural in appearance the paving surface is pleasing to the eye, particularly in the context of a swimming pool surround, for example. Artificially generated patterns should include drainage as a constraint within the design algorithm.

To create a pattern of ridges and troughs which flows from one tile to the next, the ridges and troughs at the edges of the tiles need to be made complementary to those at the edges of other tiles. The currently preferred process for achieving this is as follows:

As shown in FIG. 4, a casting from a natural surface texture or a representation of it, as produced by a method described above, is trimmed into a square 41 (FIG. 4*a*). This is cut across (horizontally) preferably not in equal halves (FIG. 4*b*)—the relative proportions of the two parts 42 and 43 are not critical. The lower part 43 is brought to the upper side of upper part 42 (FIG. 4*c*) and the two adjoined, where it can be seen that the join (p in FIG. 4*c*) is not ideal—the pattern does not flow across. The join is now sculpted by a craftsman so that the pattern does flow across (q in FIG. 4*d*). The same process is repeated in the vertical direction. When parts are arranged and sculpted to blend together in this new configuration, they form a "master plug" with complementary opposing edges, which if replicated would meet adjacent plugs without interruption of the pattern on the surface. In order to conceal the joints between the parts, the surface can be sprayed with an adhesive and then dusted with dry sand so that one plug becomes one seamless unit.

Figure 5:
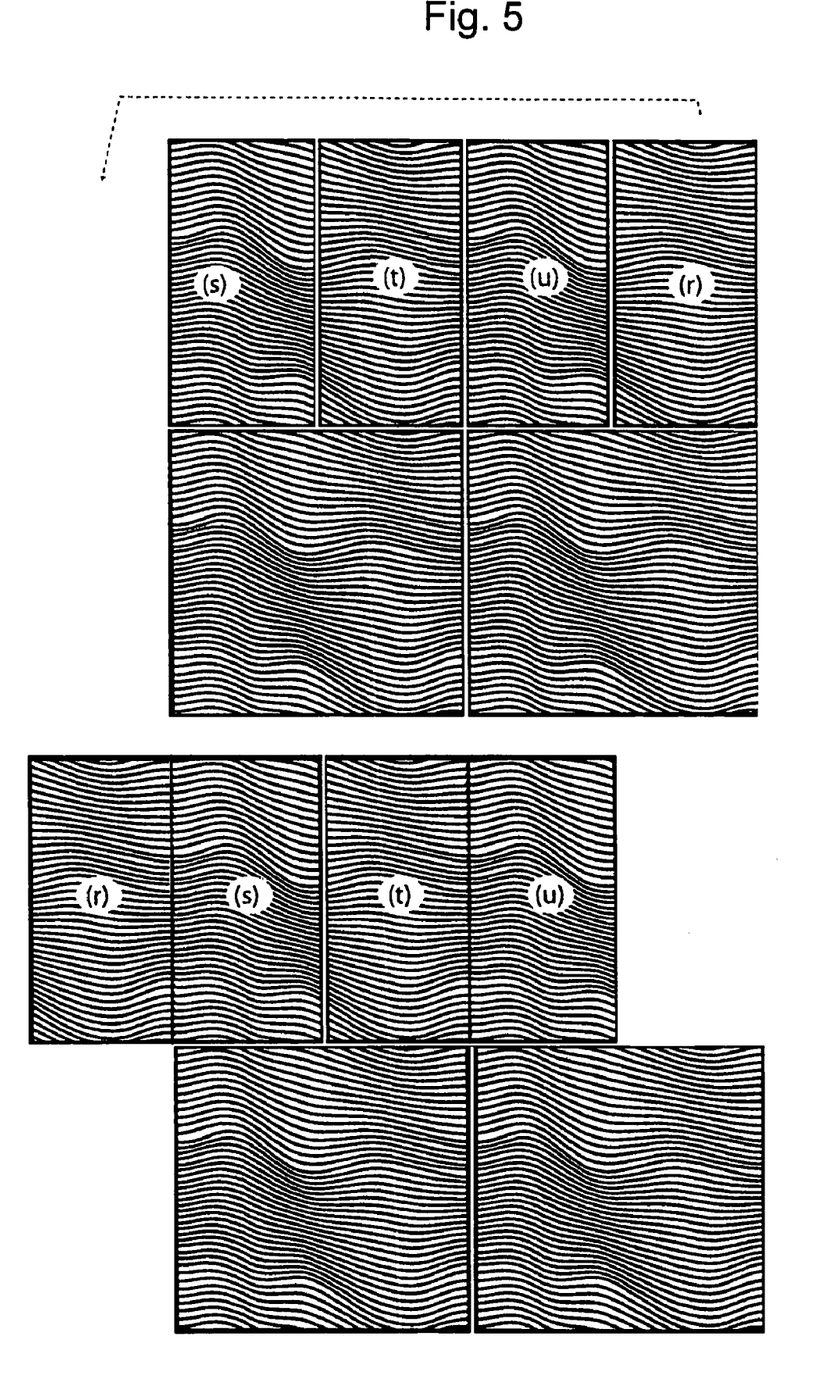

Now the master plug is cut into four equal square sections, by cutting it in half horizontally and vertically as shown in FIG. 5. Both the two top squares are cut vertically in half, portion (r) is then lifted and its rightside edge is placed up against the far left side of portion (s) and the two are fused together. No surface tooling is required this time because the two parts to be fused share the same surface and edge profile. Sections (t) and (u) are fused in the same manner leaving four offset plugs, which are used as four alternative base plates 62 for the mould.

Figure 7:
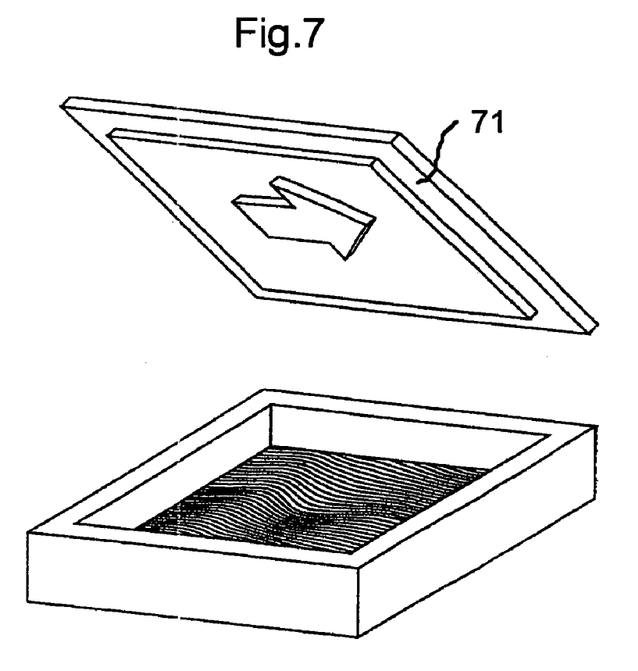

Each plug is preferably cast in a durable material such as aluminium or a plastics material. As shown in FIG. 7, a lid 71 may be used for each mould, formed from aluminium plate or similar durable material. Data such as company name, series of the moulds, arrows indicating laying direction (shown in FIG. 7), and/or a numbering system to tell the installer which tile edge shall lie against the next tile, can be formed in the lid as inverse text, so that the data appears on the bottom of the finished tile.

Production of the Product

The mould is partially filled in a void-free way with the preferred basic material—as yet uncured. We currently prefer a mixture of EPDM (ethylene propylene diene monomer) rubber chip pre-mixed with liquid urethane. This will become the wearing surface. The remainder of the mould is (or may be) filled with recycled rubber chip (as from car tyres) pre-mixed with urethane. The lid is placed on top and placed in a press with heat until the urethane has cured.

Installation

After a solid, flat (but not necessarily level; it may be undulating) surface has been prepared such as in concrete or existing ceramic tiling, the edge of each correctly placed tile is bonded to the next with urethane applied in a usual manner (such as brush or the type of glue gun used for silicone rubber), while observing the requirement for staggered laying of each successive row which is normally included so that tile corners are not contiguous (no "X" joins occur) because it is believed that increased fragility and liability to damage by growth occurs at "X" joins as opposed to "T" joins. Tiles can be cut to fit existing limiting surfaces.

EXAMPLE 2

The task of laying the material may be made easier by providing wide bands of material in rolled form which are unrolled over an adhesive-coated surface (or the rolls may include a sticky base as for sticky tape). The coating over an underlying substrate may be laid in two coats—an underlying resilient base and a top, textured resilient layer, or a single layer may include both the base and the upper surface. Laying the rolls as supplied is a standard method not unlike laying any floor covering provided in rolls and to be glued down—particularly for floor coverings to be used in outdoors environments along with appropriate adhesives and other sealants.

The textured coating may include rectangular markings to simulate the outline of tiles, or it may be left as a replica of a natural rippled area in beach or river sand, or a modified version of such a replica.

Figure 8:
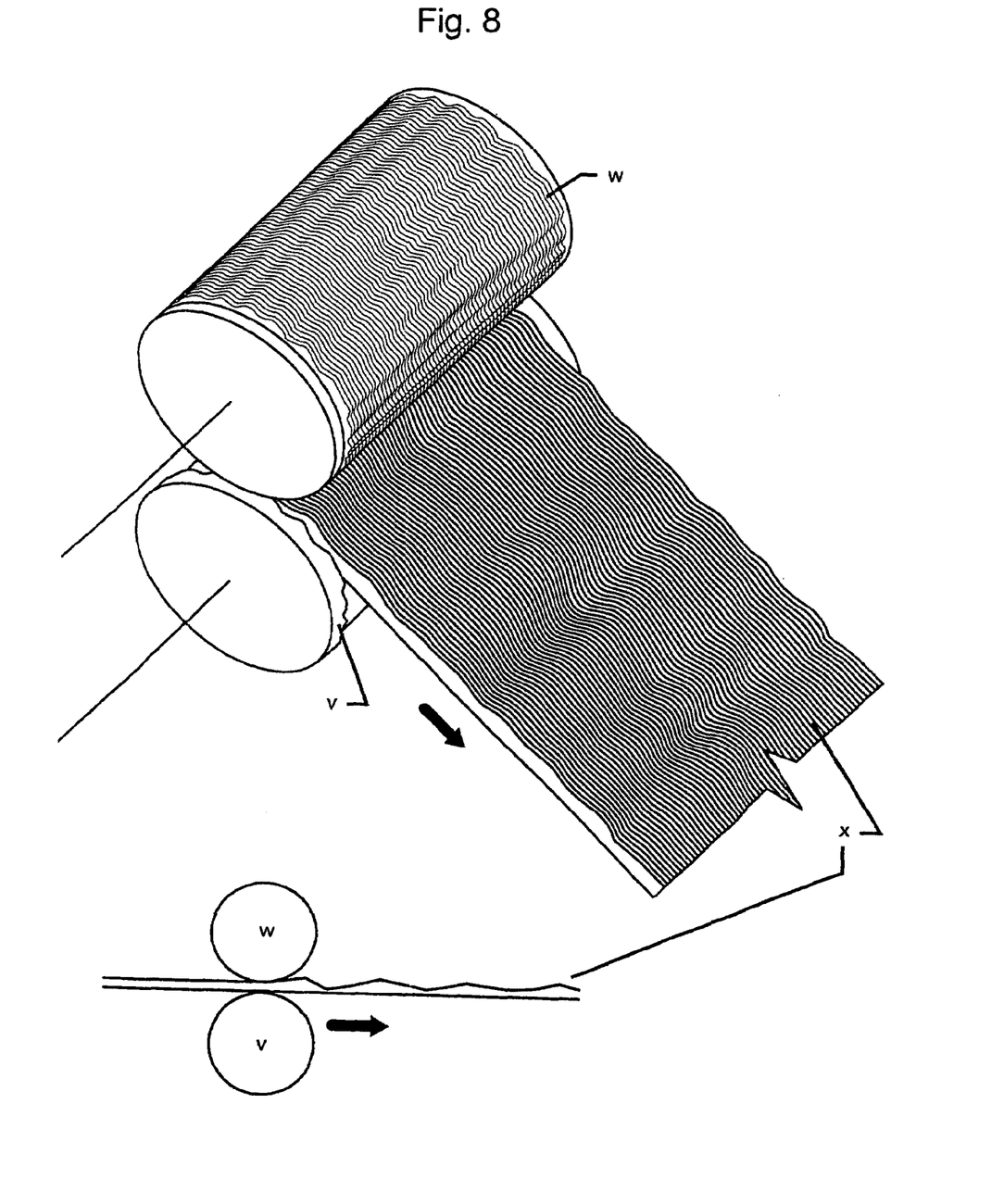
FIG. 8: shows a drum press.
Figure 9:
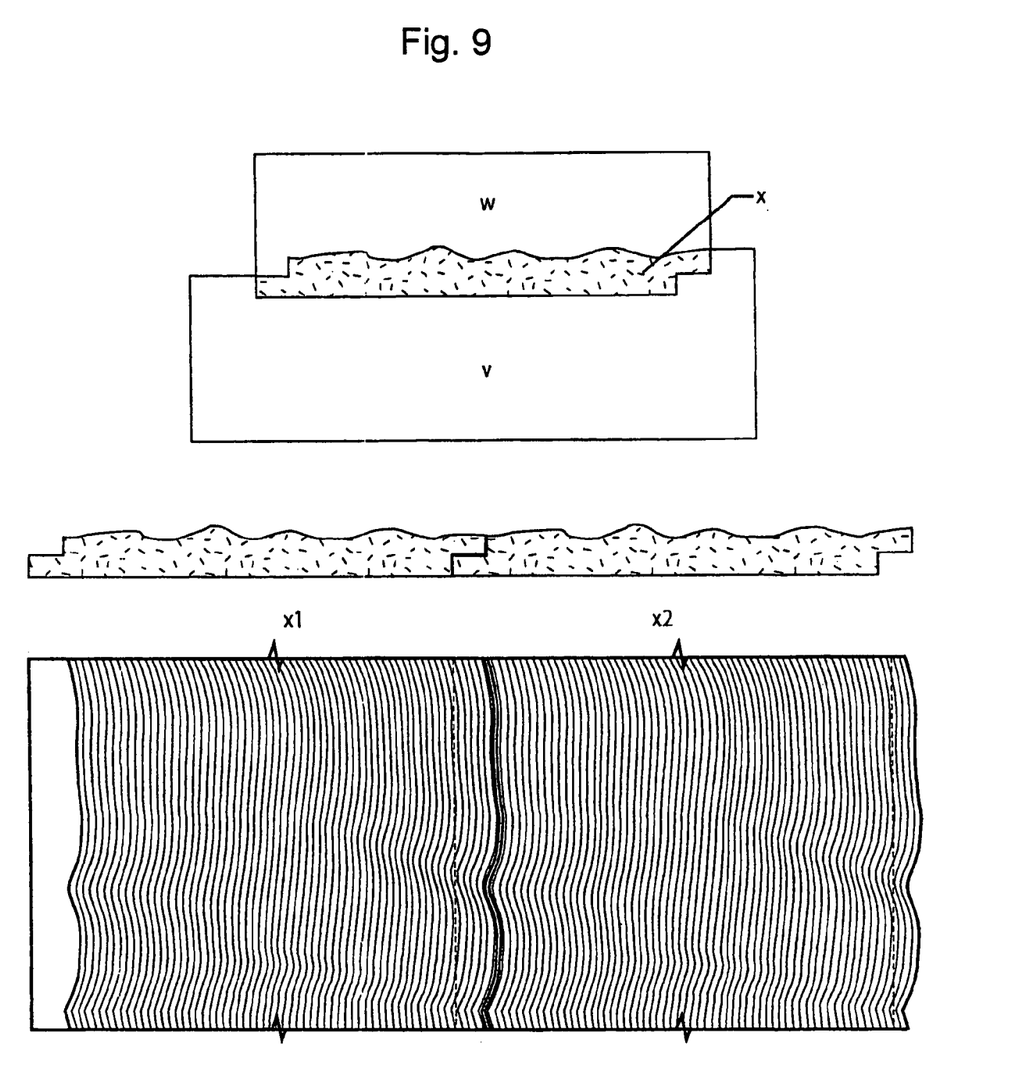
FIG. 9: shows formation of a seamless (in relation to ripples) mould for a drum press.

During manufacture, the textured coating is impressed by a method under conditions appropriate to the selected elastomer. Most likely there will be a pair of rollers, one or both of which bear a texturing as an inverse of the final pattern, which are applied to the uncured elastomer with pressure and heat is used to cause the elastomer to cure and retain the desired texturing. Creation of the rollers involves:

(a) discovering a suitable pattern, adapting a discovered pattern, or synthesising a pattern and producing a form of it for transfer on to roller surfaces (ensuring that the pattern merges around the circumference), as shown in FIG. 8;

(b) optionally developing a shaped or serrated edge that (a) conforms in protrusion with the height of the surface ripples, and (b) exactly matches with a complementary edge on the other side of the roll of floor covering, (as shown in FIG. 8) and (c) cutting along the sides of the roll so that the serrations do in fact conform with the surface ripples so that subsequent laying produces a smooth result, (that is, making tiles that match in non-regular wavy patterns in the horizontal plane as well as in the vertical plane)—see FIG. 9.

(c) applying pressure and heat to cause the applied shape to be permanently impressed.

One variation on this method is to cast long (perhaps 10-20 m long or customised to a particular swimming pool or other intended use), wide strips in shallow trays, should the relative expense of roller-based machinery be too great or the benefits of unbroken lengths be merited, and whether the chemical properties of the selected elastomer are compatible with setting in large trays. Either a chemical curing or a heat-based curing can be used. Then the strips are pulled out of the trays.

(d) Either type is then optionally coated with an adhesive and a parting covering such as waxed paper for interim protection of the sticky surface, and wound into rolls.

An alternative explanation of roller casting follows. The method described is one for making tiles by casting into specific moulds. A variation is to cast tiles in a continuous process Stage 10 (see FIGS. 8, and 9) prepares a mould by taking the plug at stage 3 and cutting along one of the ridges. The section is then joined to its corresponding edge, giving a plug having two straight edges and two edges that follow the profile cut. This is curved to fit around a cylinder having a suitable circumference for the two straight edges to meet without a gap or overlap. A drum press is made. The upper drum (w) is formed from the cylindrical mould out of a suitable material such as aluminium. The lower drum (v) carries indicia as previously described. It has a yoke at each end to create a step in the formed product while cutting a profile that allows a seamless join when the product is installed. See FIG. 9, x1 and x2).

Pool surrounds may be laid flat but may better be laid onto slightly sloping surfaces emulating the slope and direction of flow of the original surface ripples captured in the surface and providing drainage. The slope direction (in combination with the ripple pattern) may lead water away from the pool if contamination is important, or towards the pool if water conservation is important.

VARIATIONS

Mergers with flat surfaces may be provided for by making tiles that grade between a flat surface along one edge to a rippled surface at an opposite edge. This may be produced across more than one tile.

Edge cappings may be provided. In particular, edging strips may be provided which have a wedge cross section, corresponding with the thickness of the tiles at an inner edge, and tapering down to provide a thin outer edge. The underside of such edging strips might also be shaped and arranged to allow engagement over the rim of a swimming pool, so that the final paving surface extends all the way to the pool without a break or discontinuity which might present a hazard or impede water flow.

Tiles in which a ripple pattern is preserved only as colouring within an otherwise flat surface may be made.

Tiles in which a ripple pattern is impressed, supported by applied colouring (as is often seen in ripples at the beach) may be made.

INDUSTRIAL APPLICABILITY AND ADVANTAGES

Applications include covering the surrounds of swimming pools and areas where play or gymnastics occurs. The tiles may serve as a non-slip shock-absorbing safety mat.

Advantages include better grip, protection against impact accidents, pleasing appearance, and reduction of areas particularly vulnerable to wear. The resilient material may be new or recycled rubber.

Advantages may be provided by a combination of:

(a) a visually pleasing appearance (reminiscent of beach or river sand formations) with (b) a resilient material, which may cushion falls and other impacts, (c) a raised degree of grip for persons using the pool surround hence increased safety, and (d) efficient water drainage.

This version provided in rolls has among others the advantage that there are fewer crevices for moisture to attack the underlying adhesive.

Finally, it will be understood that the scope of this invention as described and/or illustrated herein is not limited to the specified embodiments. Those of skill will appreciate that various modifications, additions, known equivalents, and substitutions are possible without departing from the scope and spirit of the invention as set forth.

What I claim is:

1. A resilient paved surface comprised of a set of flat, resilient paving tiles, each tile having an upper surface patterned with irregular sinuous troughs extending to at least two edges of the upper surface, wherein the configuration of troughs at an edge of the upper surface of each tile is complementary to the configuration of troughs at an edge of the upper surface of at least one other tile in the set, whereby tiles can be abutted so that troughs formed in the upper surface are aligned and conjoined across a plurality of tiles; and in which paved surface the shapes of the irregular sinuous troughs are replicas of a repetitive pattern of ripples formed after fluid has flowed over a bed of granular material.

2. A resilient paved surface comprised of a set of paving tiles as claimed in claim 1, wherein the configuration of troughs at an edge of a tile is complementary to the troughs at a section of an edge formed across two abutted tiles, whereby a staggered arrangement of abutted tiles can create aligned and conjoined troughs across a plurality of tiles.

3. A set of paving tiles as claimed in claim 1, including a plurality of tiles having one edge of the upper surface complementary to a second edge of the same surface, whereby substantially identical said tiles can be arranged in a series with troughs aligned and conjoined.

4. A set of paving tiles as claimed in claim 3, each tile comprising an elongate strip having two opposed long edges and two opposed short edges, and having the upper surface patterned with a repeating pattern of sinuous troughs extending from one short edge to the other.

5. A set of paving tiles as claimed in claim 1, formed from an elastomer selected from the class consisting of rubber and urethane.

* * * * *